(No Model.)

G. W. WICKS.
APPARATUS FOR FORMING PLUMBERS' TRAPS.

No. 359,758. Patented Mar. 22, 1887.

Attest:
Geo. H. Botts.
D. C. Reinohl

Inventor:
George W. Wicks,
By J. E. M. Bowen
Atty.

UNITED STATES PATENT OFFICE.

GEORGE W. WICKS, OF BROOKLYN, NEW YORK, ASSIGNOR TO ARCHIBALD E. McKECHNIE, OF LYNN, MASSACHUSETTS.

APPARATUS FOR FORMING PLUMBERS' TRAPS.

SPECIFICATION forming part of Letters Patent No. 359,753, dated March 22, 1887.

Application filed December 8, 1886. Serial No. 221,025. (No model.)

*To all whom it may concern:*

Be it known that I, GEORGE W. WICKS, a citizen of the United States, and a resident of Brooklyn, in the county of Kings and State of New York, have invented certain new and useful Improvements in Apparatus for Manufacturing Plumbers' Traps, of which the following is a specification.

This invention relates to means for use in the manufacture of plumbers' traps, especially that type of trap which comprises an elongated cylindrical body having a contracted mouth fitted with a female screw-threaded nut adapted to receive a screw-threaded cap or cover. The body portion of the trap in question will be composed of soft metal, while the cap and the screw-threaded nut within the neck will be of brass.

I have devised modes and mechanism for manufacturing the type of trap referred to, whereby an article much superior to the hand-made trap can be produced, and at considerably less cost. These inventions are embodied in applications for patents duly filed in the United States Patent Office, and bearing the following serial numbers, to wit: Nos. 191,492, 191,493, 191,494, and 210,840.

In another application of this series, filed August 11, 1886, No. 210,658, I have shown and described an apparatus whereby the mouth of the cast and compressed trap-body may be fashioned into a suitably-contracted neck and the threaded nut or nut and washer secured within the said neck without the interposition of heat. The invention herein described is designed to perform the same functions as those performed by the last-mentioned apparatus, but by the employment of somewhat differently-organized mechanism.

The novel features of the present organization are set forth in the claims at the end of this specification.

Figure 1:
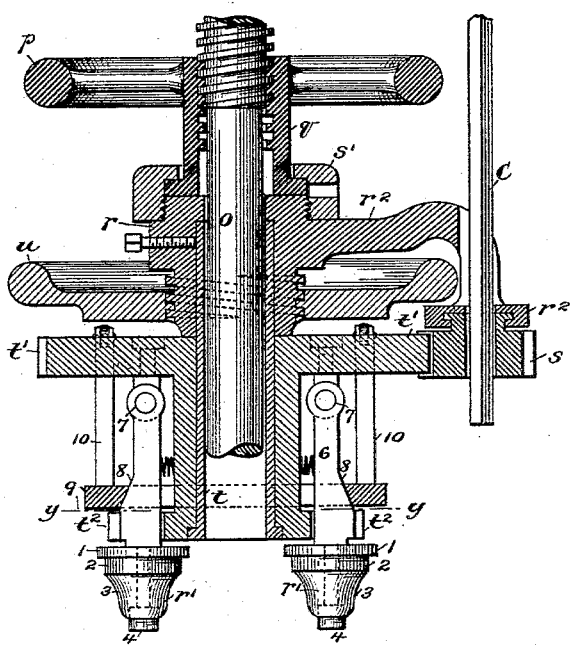
Figure 2:
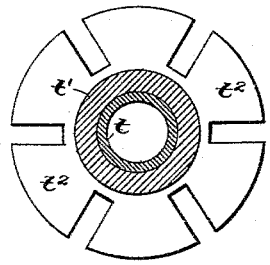

In the accompanying drawings, which form part of this description, and in which like features are indicated by like letters of reference, Figure 1 is a central vertical section of the lower part of the apparatus shown in my application last above mentioned, but embodying the variations now sought to be protected; and Fig. 2 is a cross-section on the line $y\ y$ of Fig. 1.

The object of the variations in question is to enable the rollers, by which the requisite pressure is exerted to give the desired shape to the neck of the trap, to uniformly compress the soft metal into the required shape as they are fed downward in the process of shaping the trap's neck.

The frame of the apparatus and the means for operating the latter will be the same as shown in my pending application No. 210,658, and will not therefore be described in the present instance.

As in the case just mentioned, the letter O in the annexed drawings indicates the cast-iron follower, having its upper end screw-threaded, as shown; and $t$ is a brass bushing fitted upon the follower O and keyed to the hub $r$. The bushing $t$ receives the gear-wheel $t'$ and the plate $t^2$ and furnishes bearings for the same. The hub $r$ is provided with an arm, $r^2$, which carries the pinion $s$, which meshes with the gear-wheel $t'$.

The letter $q$ indicates a sleeve screw-threaded internally, provided with the hand-wheel $p$, and fitting upon the screw-threaded top of the follower O. The nut $s'$ is provided with an interior shoulder, which rests upon the flange at the lower end of the sleeve $q$, and the lower end of said nut $s'$ screws onto the upper portion of the hub $r$, by which means it is firmly secured to the hub. The lower end of the brass bushing $t$ and the interior of the hub $r$ are provided with shoulders, which serve as bearings, respectively, for the gear-wheel $t'$ and the hub $r$.

By the above-described mechanism the mouth-shaping rollers $r'$ can be elevated or lowered independently of the means by which said rollers are revolved, and independently of the mechanism by which the follower O is elevated and lowered, since it is plain that by turning the hand-wheel $p$ in the proper direction the sleeve $q$, hub $r$, and its arm and attached pinion, with the gear-wheel $t'$, bushing $t$, and the rollers, are raised or lowered upon the follower O.

The rod $c$ is square in cross-section and passes through a square hole in the hub of pinion s, thus enabling said pinion to slide up and down on the rod in the operation of raising or lowering the roller mechanism through the instrumentality of the hand-wheel p.

Five (more or less) of the rollers r' may be employed, and their function is to give shape to the mouth of the trap and compress the lead around the screw-threaded nut, as fully explained in the application for patent hereinbefore mentioned.

In the present arrangement of my roller-shaping mechanism, the rollers are capable of exerting a uniform pressure upon the neck and shoulders of the trap as they are fed downward in the act of shaping the trap's mouth. I secure this result by the following means: I elongate the hub r at its bottom and provide said elongation with a left-hand screw-thread for the reception of a hand-wheel, u, as shown, and to enable said hand-wheel to be operated in the position it occupies the arm $r^2$ of hub r is curved upwardly and is secured to the top of the hub of the pinion s. I also elongate the hub of the gear-wheel t' and slot the flange $t^2$ of said hub from the circumference toward its center, as shown in Fig. 2, so as to permit the bolts 4, which carry the rollers r', to move toward and from the center of said flange $t^2$, as now explained.

The bolts 4 are extended above the rollers r', as shown at 6. This extension 6 is hinged at 7 to a bolt secured in the gear-wheel t' near its hub, and the lower portion of said extension 6 is broader than its upper portion, so that an inclined surface, 8, is provided upon its outer side. Resting loosely upon said inclined surface 8 is a ring, 9, whose inner circumference is beveled to conform to the inclination 8. Ring 9 is provided with four (more or less) pins, 10, rigidly affixed to the top surface of said ring 9, and passing through holes in the gear-wheel t'. The tops of these pins are provided with small friction-rollers, with which the wheel u comes in contact when said wheel is screwed down for the purpose of depressing the guide-pins 10, and consequently the ring 9, carried by the lower ends of said pins. The advantage of this construction is, that the required pressure upon the neck and shoulders of the trap-body may be exerted with greater uniformity than can be done where the rollers are rigidly secured to the flange of the hub of the gear-wheel t', as in the construction shown in my application No. 210,658.

In operating my mouth-shaping apparatus when embodying the construction herein set forth, the rollers exert but slight pressure upon the mouth of the trap when they first come in contact therewith, as their tendency is to swing outward on the hinges 7; but when the work is fairly started the revolution of the hand-wheel u, by exerting pressure upon the guides 10, forces the ring 9 down the inclines 8 of the extensions 6 of the roller-bolts, with the effect of throwing the rollers toward a common center, and thus compressing the soft metal of the mouth of the trap-casting into the required shape.

Having thus described my invention, what I claim as new, and desire to secure by Letters Patent, is—

1. The flange $t^2$, provided with radial slots, in combination with rollers r', suspended from a disk upon hinged supports, and suitable means for operating said rollers and forcing them inwardly, substantially as described.

2. The flange $t^2$, slotted radially, and a series of rollers, r', suspended from a toothed disk upon hinged supports having inclined surfaces, in combination with ring 9, guides 10, and wheel u, substantially as described.

3. A gear-wheel, t', carrying a series of rollers, r', supported upon hinged bolts or rods, in combination with hub r, wheel u, ring 9, guides 10, and pinions s, substantially as described.

Signed at New York, in the county of New York and State of New York, this 27th day of November, A. D. 1886.

GEO. W. WICKS.

Witnesses:
J. E. M. BOWEN,
JOHN BOYD.